United States Patent [19]
Mikovits et al.

[11] 3,937,264
[45] Feb. 10, 1976

[54] BEAD SEATING AND INFLATION APPARATUS FOR A TIRE CHANGING STAND

[75] Inventors: John L. Mikovits; Elmer J. Strang; Ray A. Scott; Billy L. Sorenson, all of Fort Dodge, Iowa

[73] Assignee: The Coats Company, Inc., La Vergne, Tenn.

[22] Filed: Mar. 3, 1972

[21] Appl. No.: 231,647

[52] U.S. Cl. .............................. 157/1.1
[51] Int. Cl.² ........................... B60C 25/12
[58] Field of Search .......... 157/1, 1.1, 1.17, 1.22, 157/1.24, 1.26, 1.28

[56] References Cited
UNITED STATES PATENTS

| | | | |
|---|---|---|---|
| 3,255,800 | 6/1966 | Strang et al. | 157/1.24 |
| 3,675,705 | 7/1972 | Corless | 157/1.1 |
| 3,677,320 | 7/1972 | Corless | 157/1.1 |
| 3,683,991 | 8/1972 | Ruhland et al. | 157/1.1 |
| 3,785,424 | 1/1974 | Rishoud | 157/1.1 |

*Primary Examiner*—Harold D. Whitehead
*Assistant Examiner*—Harold P. Smith, Jr.
*Attorney, Agent, or Firm*—Hofgren, Wegner, Allen, Stellman & McCord

[57] ABSTRACT

Tire bead seating and inflating apparatus of the type employing an arcuate tube having its interior connected to a source of air and including inwardly directed nozzles for directing a high volume of air under pressure toward the interface between a tire rim and a tire sidewall while air is simultaneously being applied to the interior of the tire through a conventional valve stem. The invention specifically contemplates a kit whereby such an apparatus, along with desired peripheral equipment, may be easily affixed to existing tire changing stands.

4 Claims, 5 Drawing Figures

3,937,264

BEAD SEATING AND INFLATION APPARATUS FOR A TIRE CHANGING STAND

BACKGROUND OF THE INVENTION

This invention relates to tire bead seating and inflating apparatus.

As is well-known, before tubeless tires can be inflated, it is necessary to set their beads against the wheel rim on which they are mounted to preclude air introduced into the tire through the valve from escaping between the bead and the rim. Over the years, a variety of devices for accomplishing the bead seating requirement have evolved. For example, various hoop-like devices have been employed for peripherally engaging the tire tread and forcing the same inwardly to cause the beads to seat. Such devices, while suitable for their intended purpose in most instances, are not susceptible to easy use with weak-walled tires such as radial ply tires. Moreover, they require manual placement and orientation about the periphery of the tire tread.

In attempts to improve on such prior art structures, collar-like sealing devices adapted to establish a seal between one sidewall of a tire and the edge of the corresponding rim were developed. Such structures are shown, for example, in U.S. Pat. No. 2,874,760 to Bishop and U.S. Pat. No. 2,874,761 to Varvaro. Such devices also work well for their intended purpose but are susceptible to difficulties in use either because of the fact that the collar must be manually placed as is the case with the Varvaro device or, the apparatus mounting the collar as disclosed by Biship is, for all intents and purposes, susceptible only to use as a bead seating and inflating device and cannot be used for other tire servicing purposes, thus requiring extensive manipulation of a wheel from one apparatus to another where more than simply bead seating and inflating is required.

Still another method of seating the beads of tires and inflating is that of creating a pressure differential across a tire sidewall. U.S. Pat. No. 3,552,469 to Corliss and U.S. Pat. No. 2,874,759 to Ranallo illustrate apparatus employing this princple but, in each instance, inflexibility of use of the apparatus or the requirement of manually locating the device prior to use is a significant drawback.

The difficulties attendant the use of the Corliss and Ranallo apparatus mentioned in the preceding paragraph have, in a large part, been overcome by the proposal of Strang et al in commonly assigned application Ser. No. 179,298, filed Sept. 10, 1971, entitled "Tire Bead Seating and Inflating Apparatus". But, even with such equipment, manual effort is required to move the bead seating and inflating apparatus to and from operative positions.

It has also been proposed that apparatus of the type disclosed by Corliss be mounted on the table of a conventional tire changing apparatus, thus eliminating any need for manual orientation of the device between operative and inoperative positions or, when a tire is to be placed on or removed from the tire changing device. However, this proposal is overly simplistic in its approach and some difficulty may be experienced with the same in terms of inflating tires on different size rims. Moreover, the same fails to contemplate peripheral equipment associated with such a bead seating and inflating device that may be of great assistance to the operator of such apparatus in maximizing the efficiency of the tire changing operation including the seating of the beads of the tire and the inflation thereof.

SUMMARY OF THE INVENTION

It is the principal object of the invention to provide a new and improved tire bead seating and inflating apparatus. More particularly, it is an object of the invention to provide such an apparatus which does not require manual manipulation during operation and which may be advantageously employed in conjunction with tire changing equipment, which operates on the pressure differential principle, is operative with a wide range of varying rim sizes, includes a variety of peripheral equipment to maximize the efficiency of the operation, and which is configured such that it may be installed on tire changing stands at a factory as original equipment or, alternatively, easily installed on existing tire changing equipment in the field as a kit.

The exemplary embodiment achieves the foregoing objects by a construction including an arcuate tube or air ring which may be mounted on the table of a conventional tire changing apparatus in a relation concentric with the usual spindle found thereon. Preferably, the tube is intended for mounting on tables of the type where at least a part of the rim receiving surface is generally frusto-conical. In such an instance, the air nozzles on the tube are directed upwardly and inwardly at an angle such that streams of air issuing therefrom will be generally parallel to corresponding portions of the frusto-conical surface whereby air will be directed at a tire in the same direction regardless of the rim size thereof.

To facilitate conversion of tire changing apparatus already in the field, the invention contemplates a housing which may be secured to such tire changing apparatus. The housing in turn mounts a surge tank which may serve as a source of air under pressure for both the air ring and an air chuck which may be affixed to a valve stem on a wheel rim received on the table of the tire changing stand. The housing may mount a pressure gauge having an indicator on the external portion of the housing as well as an air relief valve having an operator exteriorly of the housing. A pair of valves are provided with the assemblage along with means for securing the same to a tire changer and the valves are provided with a common actuator. One of the valves is interconnected between the surge tank and the air ring to control the flow of air through the nozzles of the latter. The other valve is connected between the surge tank and the air chuck to control the flow of air to the air chuck. The air relief valve and the pressure indicator are connected to a conduit extending between the valve controlling flow of air to the air chuck and the air chuck itself so that when the valve is closed, pressure in the tire may be monitored and, if necessary, the relief valve operated to selectively relieve air from the tire.

The common actuator for the two valves is arranged to be movable through three positions. A first of the positions is such that both valves are closed, while a second position is such that air will be allowed to pass to the air chuck only. The third position permits the passage of air to both the air ring and the air chuck. Thus, through a single actuator, an operator of the apparatus can easily control the same throughout the bead seating and inflating operation.

Other objects and advantages will become apparent from the following specification taken in conjunction with the accompanying drawings.

DESCRIPTION OF THE PREFERRED EMBODIMENT

Figure 1:
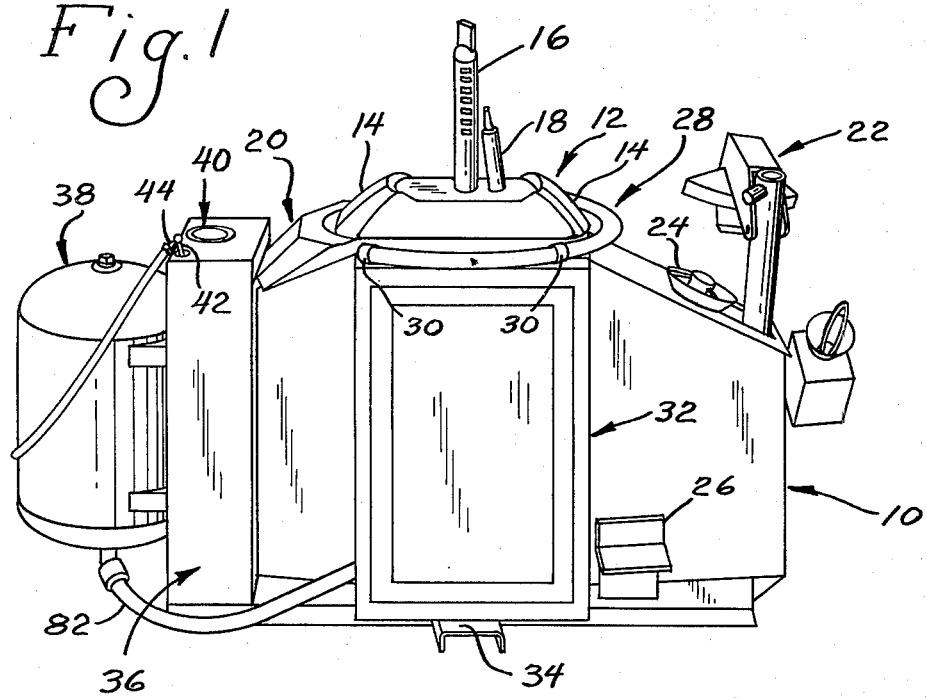
FIG. 1 is a perspective view of a conventional tire changing stand having an embodiment of the invention affixed thereto.

With reference to FIG. 1, an examplary embodiment of the invention is shown in connection with a tire changing stand, generally designated 10, which may be of the type disclosed in Strang et al U.S. Pat. No. 3,255,800. Of course, the invention is also suited for use with a variety of other types of stands as well. As is known, such a tire changing stand 10 includes a tire changing table, generally designated 12, which will normally be formed as a heavy metal stamping and which includes portions 14 having frusto-conical configurations. That is, if the opposite portions 14 illustrated in FIG. 1 were continued about the entire periphery of the table 12, a generally frusto-conical surface would be defined thereby.

Extending upwardly from the center of the table 12 is a center post or spindle 16 which may receive the central aperture in a tire rim along with a plunger 18 which may be disposed in a lug hole in a wheel rim for purposes well known.

The assemblage further includes a lower bead breaking assembly, generally designated 20, and an upper bead breaking assembly, generally designated 22. The equipment also includes an internally threaded cone member 24 which is employed on the spindle 16 in a manner well known as well as a control pedal 26 for controlling operation of the stand 10.

The interrelation of the various components described thus far is described in greater detail in the above-identified Strang et al U.S. Pat. No. 3,255,800 and reference may be had thereto for additional details.

With continued reference to FIG. 1, the invention with which the instant application is concerned includes an air ring, generally designated 28, which is mounted in concentric relation to the table 12 relative to the spindle 16 in any suitable manner. Preferably, eye brackets 30 formed of sheet metal may be employed for this purpose. The air ring 28 is circular and has a peripheral extent greater than the majority of a circle and which is limited only by the presence of the lower bead breaking assembly 20. That is, the ends of the air ring 28 terminate short of the lower bead breaking assembly 20 so as to not interfere with operation of the same. Additionally, there is provided a front console, generally designated 32, which mounts a variety of components for controlling the bead seater and inflating apparatus of the invention and which, at its lower end, has an outwardly projecting foot pedal 34 operable to control the operation.

A second housing or console, generally designated 36, is adapted to be secured to the left side of the tire changing stand 10 and serves as a securing means for a source of air under pressure, namely, an air surge tank 38. The console 36 mounts a pressure gauge, generally designated 40, as well as an operator 42 for an air release valve. As a last basic component, the invention includes a conventional air chuck 44 which, as is well known, may be placed in operative relation on a valve stem on a wheel rim to cause air under pressure to pass through such valve stem.

Figure 2:
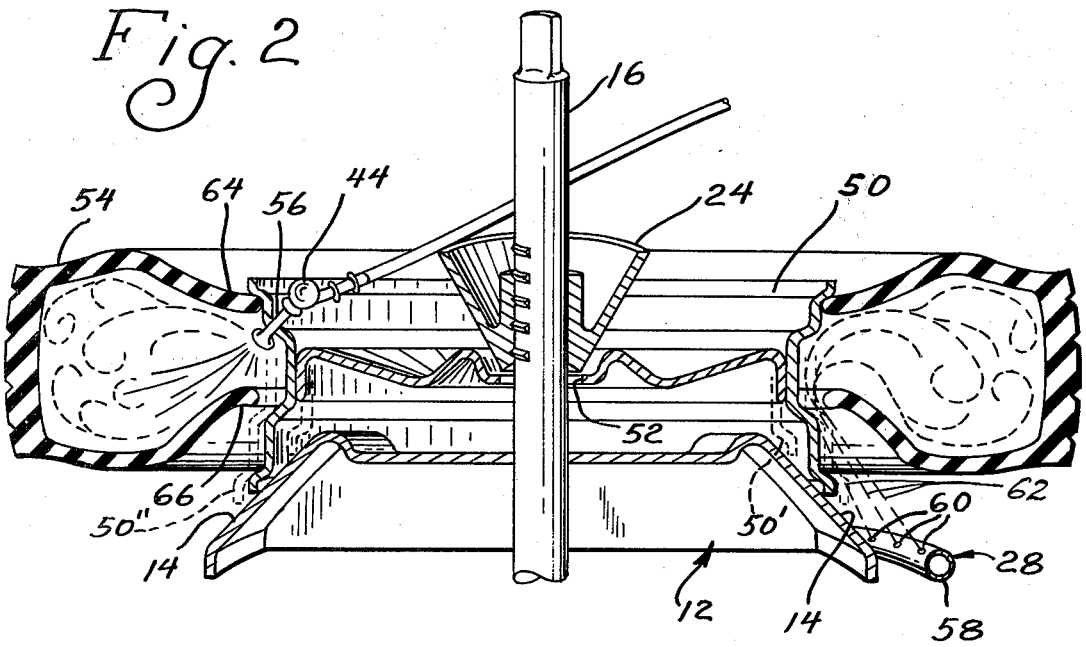
FIG. 2 is a vertical section illustrating the arrangement of an air ring with respect to a portion of the tire changing stand table and further illustrates the relation of air jets issuing from the air ring to a variety of rims of different sizes, several shown in dotted lines.

With reference now to FIG. 2, the table 12 is seen to be supporting a tire rim 50 having a central opening 52 through which the spindle 16 extends. About the rim 50 is a tire carcass 54 and the rim further includes a conventional valve stem 56 in fluid communication with the air chuck 44 and the interior of the tire carcass 54. The air ring 28 is seen to be comprised of a tube 58 having a plurality of inwardly and upwardly directed air nozzles 60 therein. That is, the air nozzles are directed inwardly toward the spindle 16 and upwardly toward the rim 50 resting on the table 12.

The air nozzles 60 may be easily formed simply by punching apertures in the tube 58, but it is highly desirable that the upward inclination be such that the individual air streams 62 issuing from the nozzles are parallel to the underlying portions of the surface of the frusto-conical portions 14. Stated another way, the nozzles 60 should be configured such that the air streams 62 will define a conical configuration which is the same as the cone that would be defined by the frusto-conical portions 14 if a full cone were to encompass those postions. For example, if the frusto-conical portions 14 are at an angle 45° to the horizontal, the air streams 62 should leave the air ring 28 at an angle approximately 45° to the horizontal.

As can be seen, an upper bead 64 of the tire carcass 54 has been seated against the upper boundary of the rim 50 while a lower bead 66 of the tire has not been seated and the air streams 62 with the nozzles 60 configured in relation to the frusto-conical portions 14, as mentioned above, will be directed at the interface of the lower bead 62 and the tire rim 50 and passed between the two into the interior of the tire to inflate the same in accordance with the well-known pressure differential principle. Thee resulting inflation will cause the bead 66 to progressively move downwardly until finally it too seats against the rim 50. At this time, further inflation may be maintained soley through the air chuck 44.

It will further be appreciated that the above-described arrangement of the air nozzles 60 with respect to the frusto-conical portions will result in the air streams 62 having the same angle of attack on a rim and a tire carcass regardless of rim size. For example, if a smaller rim indicated in dotted lines at 50' is employed the angle of attack will remain the same, while if a larger rim, indicated in dotted lines at 50'' is employed the angle of attack again will be the same. Thus, the arrangement permits an optimum angle of attack for the air streams to be employed for a variety of different sizes of rims.

Figure 3:
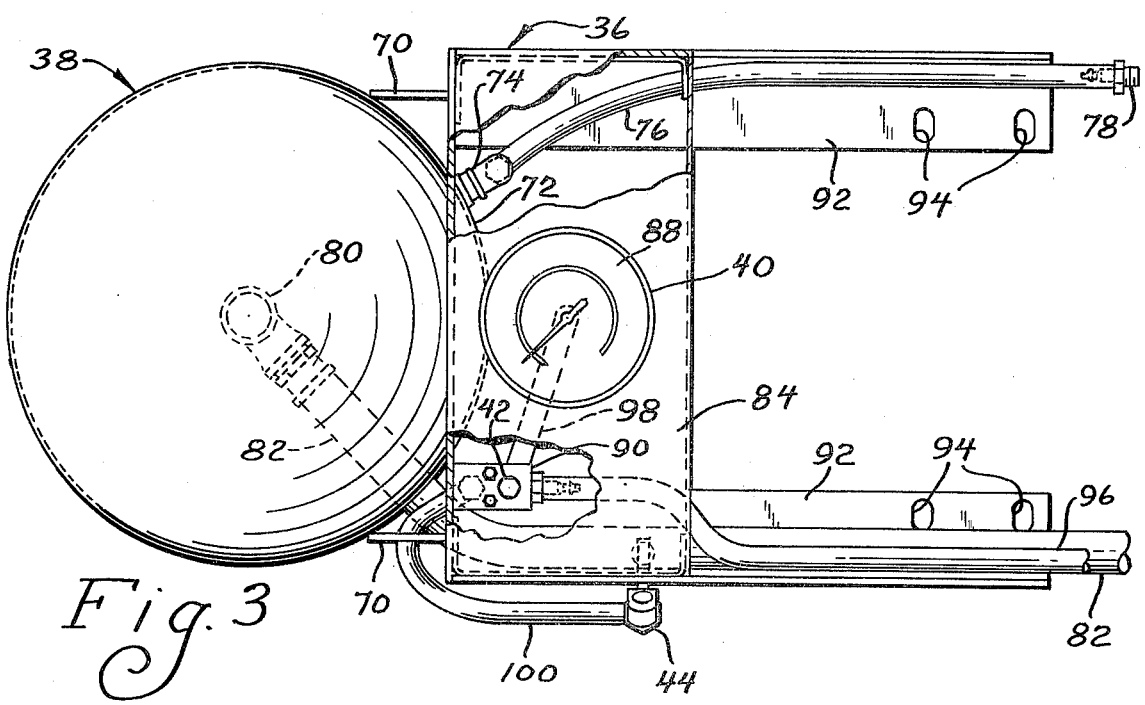
FIG. 3 is a plan view of a portion of a kit made according to the invention with parts broken away for clarity.

Turning now to FIG. 3, the surge tank 38 is seen to be secured to the second console 36 by four brackets 70 (only two of which are shown) and, includes a portion 72 extending through an opening in a side wall of the console 36. Within that portion 72 of the surge tank 38 within the console 36 is a fitting 74 which may be connected to an air conduit 76 which, in turn, terminates in a fitting 78 exterior of the console 36 for connection to a compressor or the like. The conduit 76 serves to deliver air under pressure to the interior of the surge tank 38.

As may be ascertained from FIGS. 1 and 3, the underside of the surge tank 38 includes a depending elbow 80 which is connected to a large conduit 82 which delivers air from the source, the surge tank 38, to the air ring 28 and the air chuck 44 via a control system to be described in greater detail hereinafter.

The console 36 on its upper side 84 mounts the pressure gauge 40 which has an indicating portion 88 on the exterior surface of the console. Also within the console 36 is an air release valve 90. Also within the console 36 is an air release valve 90. As will be recalled from the description of FIG. 1, an actuator 42 for the air release valve 90 is located exteriorly of the console 36.

At the lower end of the console 36 there is a pair of inwardly extending rails 92 formed of angle irons. The horizontal portions of the rails 92 include a plurality of apertures 94 through which bolts or the like (not shown) may be passed to secure the console 36 to the underside of the tire changing stand 10 in the configuration illustrated in FIG. 1.

The assemblage is completed by conduits 96, 98 and 100. The conduit 96 extends from the control system, to be described in greater detail hereinafter, and directs air through the air release valve 90, when the latter is closed, to both the conduit 98 and the conduit 100. The conduit 100 is connected to the air chuck so that when air under pressure is being passed through the conduit 96 and the air release valve 42 is closed, a tire on the stand may be inflated through the air chuck 44.

The conduit 98 extends to the pressure gauge 40 so that the latter, with its indicator 88, may provide an indication of the pressure of the air within the conduits 96 and 100. It will be appreciated that as a result of the foregoing construction, even when air is not flowing through the conduit 96, the presence of the conduit 98 will result in the pressure gauge 40 giving a reading corresponding to the air pressure in a tire on the stand if the chuck 44 is fitted on the valve stem 56 thereof. The system may be used to monitor the inflation pressure of such a tire such that bead seating and inflating operation may be temporarily stopped and the pressure monitored. If the pressure is in excess of the desired pressure, the manual actuator 42 may be operated to open the air release valve 90 to release some air. This procedure may be repetitively accomplished until the pressure in an inflated tire is at the desired level.

Figure 4:
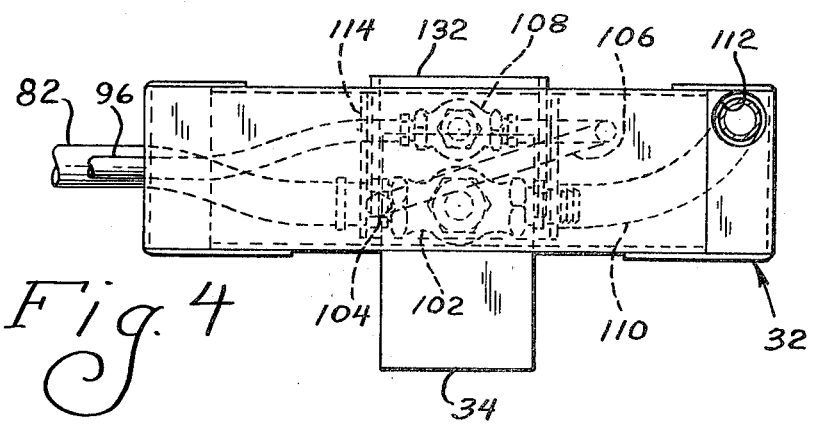
FIG. 4 is a plan view of another portion of a kit made according to the invention.
Figure 5:
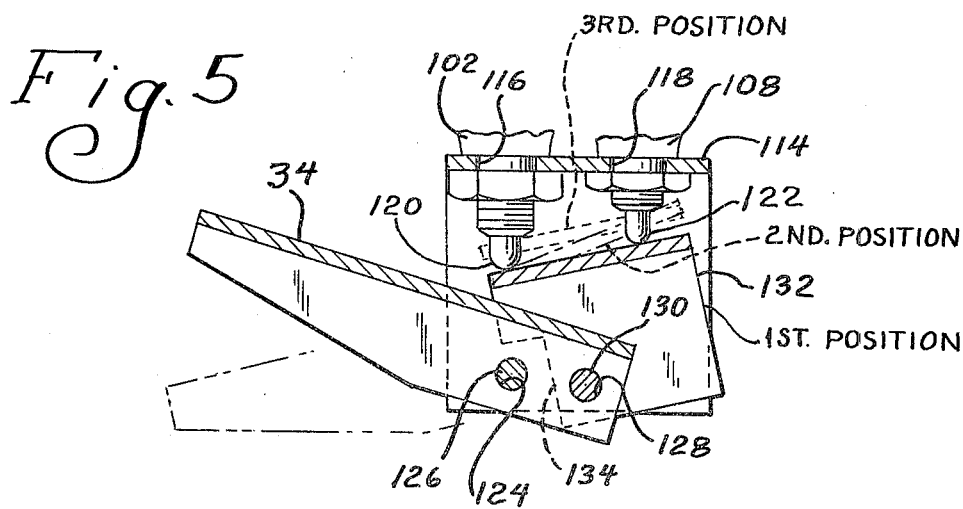
FIG. 5 is a somewhat schematic illustration of a common actuator for a pair of valves employed in one embodiment of the invention.

Turning now to FIGS. 4 and 5, the control components of the invention will be descirbed. As generally alluded to previously, the same are housed in the first console 32 which may be formed of sheet metal or the like and secured to the front of the tire changing stand 10 by any suitable means such as self-tapping screws or the like. The conduit 82 from the surge tank 38 is led to the console 32 and enters the same in any suitable manner. Within the console 32, the conduit 82 is connected to a relatively large, normally closed, spring loaded valve 102. At approximately the point of connection of the conduit 82 to the valve 102, a fitting 104 is located and a conduit 106 is secured thereto and connected to a smaller valve 108, also within the console 32 and, again, of the normally closed, spring loaded variety. The conduit 96 which, it will be recalled, is connected to the air release valve 90, has its opposite end connected to the valve 108.

A conduit 110 is connected, within the housing, to the valve 102 and emerges through an aperture 112 in the upper side thereof to be connected to the air ring 28. Thus, it will be appreciated that the valve 102 controls the flow of air to the ring 28 while the valve 108 controls the flow of air to the air chuck 44.

the foot pedal 34 is operative to selectively open both of the valves 102 and 108. In particular, the same is movable through three positions. In the first position, both of the valves 102 and 108 will be in their normally closed configuration. In a second position intermediate the first and the third positions, the foot pedal is operative to open the valve 108 while permitting the valve 102 to remain closed. In this position, air will flow to the air chuck 44 only. In the third position, the foot pedal 44 is operative to cause both valves to be opened so that air will flow both to the air chuck 44 and to the air ring 28.

The structure by means of which the foregoing is accomplished is best illustrated in FIG. 5. In particular, a stamped metal channel bracket 114 is secured to the underside of the console 32 and includes openings 116 and 118 through which valve operators 120 and 122 for the valves 102 and 108 respectively extend. As mentioned previously, both of the valves 102 and 108 are of the normally closed variety and are spring loaded such that their operators 120 and 122 are biased outwardly from the valve bodies (downwardly as shown in FIG. 5).

It will also be recalled that the valve 102 is a larger valve than the valve 108 and as a practical matter, manufacturers of such valves, employ larger springs in larger valves than in smaller ones. Thus, there will be a greater biasing force tending to close the valve 102 than the biasing force tending to close the valve 108 with the result that a greater force must be exerted upwardly on the operator 120 for the valve 102 to open the latter than need be applied to the operator 122 for the valve 108. Advantage is taken of this fact as will be seen.

The foot pedal 34 is generally in the form of an inverted channel and the sides thereof include aligned apertures 124 through which a pivot rod, normally a bolt, 126 extends. The bolt also extends through aligned apertures (not shown) in the sides of the channel bracket 114 so that the foot pedal 34 is secured thereto for pivotal movement about the axis defined by the bolt 126.

The foot pedal 34 also includes a second set of aligned apertures 128 near its innermost end for receiving a pivot rod 130.

The assemblage is completed by a pedal bracket 132 formed in the shape of a channel and having a cut-out 134 in both sides thereof in the vicinity of the bolt 126 so as to preclude interfering contact between the tow. The width of the channel of the pedal bracket 132 is slightly greater than the width of the pedal 34 so that the sides of the former may be interposeed between the sides of the latter and the sides of the channel bracket 114.

Adjacent the cut-outs 134, the sides of the pedal bracket 132 include aligned apertures (not shown) which receive the ends of the pivot pin 130 so as to pivotally secure the pedal bracket 132 to the innermost end of the pedal 34. The arrangement of the various components is generally shown in FIG. 5, it being of some significance that the location of the pivot axis defined by the pivot pin 130 be between vertical planes parallel to such pivot axis and extending through the operators 120 and 122 for the valves 102 and 108.

Also of some significance is the location of the bolt 126. Firstly, the same must be on the large valve side of the pivot pin 130 and secondly, is preferably located just inside the aforementioned vertical plane extending through the operator 120 for the valve 102 although, depending upon dimensions of the other components, a fair amount of deviation from this relation is allowable.

With the foot pedal 34 in its first position, namely, that wherein both valves are closed, the assemblage will have the configuration illustrated in FIG. 5 with the web of the pedal bracket 132 in contact with the lowermost ends of the valve operators 120 and 122. The spring biasing of the valves will cause the assemblage to assume this configuration whenever a downward force is not applied to the left-hand end of the foot pedal 34.

When the pedal 34 is partially depressed i.e., the pedal 34 is pivoted counterclockwise about the bolt 126, the pivot pin 130 will be elevated along with the pedal bracket 132. However, the greater resistance posed by the heavier spring loading of the valve 102 and conveyed to the left-hand end of the pedal bracket 132 via valve operator 120 will result in pivoting of the pedal bracket 132 about the pivot axis defined by pin 130 on the pedal 34, also in a counterdclockwise direction so that once the pedal 34 has been depressed to the second of its positions, the web of the pedal bracket 32 will assume the dotted line position designated by the legend "SECOND POSITION" whereat only the operator 122 for the valve 108 will have been moved to open that valve. Thus, in such a position, the valve 102 will remain closed while the valve 108 will be open.

Further pivotal movement of the pedal 34 in the counterclockwise direction will result in the opening of the valve 102 as follows. Specifically, the right-hand end of the web of the pedal bracket 132 will be blocked from further movement in an upwardly direction by a portion of the valve body. Thus, continued elevation of the pivot pin 130 will result in pivotal movement of the pedal bracket 132 in a clockwise direction about pivot pin 130 to raise the left-hand end of the web thereof against the force applied by the operator 120 to open the valve 102. When such has occurred, the web of the pedal bracket 132 will be in the dotted line position designated by the legend "THIRD POSITION" and both valves 102 and 108 will be opened.

The invention may be used as follows. A tire rim with an unseated tire carcass 54 thereon may be placed on the tire changing stand and secured in place through the use of the cone 24. The operator may lift up the tire carcass 54 to partially seat the upper bead 54. The air chuck 44 may then be applied to the valve stem 56 and the pedal 34 depressed from its first position to its third position. This will result in the opening of both of the valves 102 and 108 so that the air ring 28 will be operative to force air into the tire through the interface of the rim and the lower bead 62 while additional air will be forced into the tire through the air chuck 44. At some point, inflation will be sufficient to cause the lower bead 66 to seat. At this time, the operator may allow the foot pedal 34 to move from the third position to the second position, at which time, the valve 102 will be closed ceasing operation of the air ring 28 but causing the valve 108 to remain open to cause further inflation via the air chuck 44. When the operator believes the tire to be sufficiently inflated, he may then release the pedal 34 completely so that it will return to its first position, at which time both valves 102 and 108 will be closed and the pressure in the tire may be checked via the indicator 88 of the pressure gauge 40. Should the tire be underinflated, the pedal 34 may be depresssed to its second position to cause further admission of air. In the event the tire is overinflated, the actuator 42 for the air release valve 90 may be manually manipulated to release air in the tire to bring pressure with the tire down to a desired value.

It will be appreciated from the foregoing that the invention provides many advantages over various devices heretofore known. For example, by use of the surge tank 38, during inoperative periods, sufficient pressure may be built up within the apparatus itself so as to insure the presence of sufficient air under pressure to rapidly complete a bead seating and inflating operation. It will also be appreciated that the use of a single operator for the two control valves permits the operator to have substantially more freedom in performing the operation. The presence of the pressure gauge and the air release valve allow rapid monitoring of inflation pressure and release of pressure in the case the tire is overinflated. And, the construction of the various consoles is such that the invention may be easily embodied on new tire changing stands at their point of manufacture and before shipping or, alternately, may be embodied on existing tire stands already out in the field with a minimum of labor. The orientation of the air nozzles with respect to the configuration of the table optimizes the bead seating portion of the operation for any of a variety of differing sizes of rims. And, finally, the tire changing stand on which the invention may be employed is fully usable for its conventional function such that tire changing as well as bead seating and inflating may be accomplished on but a single apparatus without the need for relocating various components during different steps of the combined operations.

We claim:

1. A kit for converting a tire changing stand to a combination tire changing stand and a tire bead seating and inflating apparatus comprising: an arcuate tube having a plurality of inwardly directed air nozzles and adapted to be affixed to a tire changing stand in a relation generally concentric to a table top and spindle thereon; a first conduit in fluid communication with said tube and said air nozzles thereon and adapted to be connected to a source of air under pressure; first valve means in said conduit for controlling the flow of air from said source to said air nozzles; an air chuck adapted to be connected to a valve stem on a wheel rim received on said table top, a second conduit having one end connected to said air chuck and another end adapted to be connected to a source of air under pressure; second valve means in said second conduit for controlling the flow of air therethrough; means defining a common actuator for said first and second valves, said common actuator being movable between three positions, one of which causing both said valve means to be closed, another of which causing both said valve means to be open, and the last of which causing said first valve means to be closed and said second valve means to be open; and means for securing said arcuate tube, said valves and said actuator to a tire changing stand.

2. The kit of claim 1 further including an air surge tank, said first and second conduits being connected to said air surge tank; and means for securing said air surge tank to a tire changing stand.

3. Apparatus according to claim 2 wherein said means for securing the surge tank to a tire changing system comprises a generally upright housing which may be connected to a tire changing stand and having said surge tank secured thereto; a pressure gauge mounted on said housing and having an indicator on the exterior thereof; an air release valve mounted in said housing and having an actuator externally thereof; said second conduit being connected to said air surge tank via air release valve and said pressure gauge being in fluid communication with said second conduit between said air chuck and said second valve means whereby air pressure within a tire on said table top may be ascertained when said common actuator is in said first position by visually observing said indicator of said pressure gauge and said air release valve selectively operated to relieve pressure from a tire if said pressure gauge indicates a higher than desirable pressure in the tire.

4. A kit according to claim 3 wherein said housing includes at least two parallel rails extending to one side thereof, said rails being adapted to be connected to a tire changing stand to secure said housing and said surge tank thereto.

* * * * *